United States Patent
Schieke

(10) Patent No.: US 8,896,975 B2
(45) Date of Patent: Nov. 25, 2014

(54) VOLTAGE REGULATOR OVER-VOLTAGE DETECTION SYSTEM, METHOD AND APPARATUS

(75) Inventor: Pieter Schieke, Phoenix, AZ (US)

(73) Assignee: Microchip Technology Incorporated, Chandler, AZ (US)

(*) Notice: Subject to any disclaimer, the term of this patent is extended or adjusted under 35 U.S.C. 154(b) by 205 days.

(21) Appl. No.: 13/352,698

(22) Filed: Jan. 18, 2012

(65) Prior Publication Data

US 2013/0182353 A1 Jul. 18, 2013

(51) Int. Cl.
*H02H 7/00* (2006.01)

(52) U.S. Cl.
USPC .......................................... 361/18; 361/91.1

(58) Field of Classification Search
CPC ....... H02H 3/087; H02H 7/1213; H02H 1/04; H02H 3/20; H02H 9/00; H02H 9/04; H02H 9/045; H02H 9/046; H02H 7/00; H02H 7/0822; H02H 7/09; H03K 17/0822; G05F 1/573; H01L 27/0248; H01L 23/62; G06F 1/30

See application file for complete search history.

(56) References Cited

U.S. PATENT DOCUMENTS

| 5,513,062 | A  * | 4/1996 | Paul et al. ........................ 361/18 |
| 6,121,759 | A  * | 9/2000 | Uusitalo ........................ 323/272 |
| 2008/0123236 | A1 | 5/2008 | Wang ............................ 361/91.1 |
| 2008/0136450 | A1 | 6/2008 | Simmons et al. ............... 326/62 |
| 2010/0123979 | A1 | 5/2010 | Naito et al. ..................... 361/18 |
| 2010/0254051 | A1 | 10/2010 | Jeon et al. ........................ 361/56 |
| 2011/0133711 | A1* | 6/2011 | Murakami et al. ............. 323/282 |
| 2011/0211281 | A1* | 9/2011 | Huang et al. .................... 361/18 |

FOREIGN PATENT DOCUMENTS

WO 2008/118933 A1 10/2008 .............. G06F 1/32

OTHER PUBLICATIONS

International Search Report and Written Opinion, Application No. PCT/US2013/021825, 10 pages, Jun. 26, 2013.

* cited by examiner

*Primary Examiner* — Jared Fureman
*Assistant Examiner* — Terrence Willoughby
(74) *Attorney, Agent, or Firm* — King & Spalding L.L.P.

(57) ABSTRACT

Monitoring of a core logic internal voltage regulator output is performed to detect, alarm and put an integrated circuit device into a safe mode when the voltage on the core logic exceeds a safe operating voltage value. This allows putting the integrated circuit devise into a predictable, detectable and safe mode, and to alarm the over-voltage condition to a system monitor to alert on a fault and subsequent fault disposition.

23 Claims, 4 Drawing Sheets

VOLTAGE REGULATOR OVER-VOLTAGE DETECTION SYSTEM, METHOD AND APPARATUS

TECHNICAL FIELD

The present disclosure relates to integrated circuit devices used in consumer, business and industrial appliances that may require third party safety certification, and more particularly, to integrated circuit devices having over-voltage detection and fault protection.

BACKGROUND

Consumer, business and industrial appliances require third party safety certification, e.g., UL: Underwriters Laboratories Inc., CSA: Canadian Standards Association, ETL: Intertek Testing Services, and/or CE: Conformance European (Communaut Europ enne or Conformit Europ enne), etc. Product certification programs are accredited by the United States Occupational Safety and Health Administration (OSHA), the American National Standards Institute (ANSI), and the Standards Council of Canada (SCC). Certification requires that fault conditions be detected and dealt with in a safe and predictable manner. In a digital device, e.g., a microprocessor, a microcontroller, etc., that uses an internal voltage regulator with an external filter capacitor, there is the possibility that the integrated circuit package pin connected to the external filter capacitor can come in contact, e.g., be short-circuited, with another adjacent package pin having a higher voltage thereon, thereby putting the functionality of the integrated circuit device at risk. This could have dire consequences for operation of the appliance controlled by the integrated circuit device.

The external filter capacitor connection, Vcap/Vddcore, pin may be situated between a higher voltage, Vcc, pin (usually 3 to 3.6 volts) and a ground, Vss, pin. If the Vcap/Vddcore pin should short to ground, Vss pin, then the brown-out-reset (BOR) and/or power-on-reset (POR) circuits will detect a low voltage condition and force the integrated circuit device into a reset state that is well defined. However, if the Vcap/Vddcore pin is shorted to the Vcc pin then the internal logic circuits of the integrated circuit device can degrade to unknown states due to the too high voltage being applied thereto (an unsafe condition). The internal logic circuits are usually designed for an operating voltage of from about 1.8 volts to about 2.5 volts.

SUMMARY

Therefore, a need exists for over voltage detection (OVD) of an over voltage condition on the Vcap/Vddcore pin of an integrated circuit device. Wherein when an over voltage situation is detected, the output of the OVD circuit may be used to put the integrated circuit device into a predicable and safe mode of operation.

According to an embodiment, an integrated circuit device having an internal voltage regulator over-voltage detection circuit may comprise: an internal voltage regulator coupled to external connections for a filter capacitor and a supply voltage; an over-voltage detection circuit having an input coupled to a regulated voltage output of the internal voltage regulator; core logic circuits receiving operating voltage from the regulated voltage output of the internal voltage regulator; and at least one output driver having a failsafe circuit for maintaining the at least one output driver in a safe operating condition; wherein when the over-voltage detection circuit detects a high voltage at the regulated voltage output of the internal voltage regulator, the core logic circuits and the at least one output driver are put into a safe operating mode.

According to a further embodiment, an over-voltage alarm is coupled to the over-voltage detection circuit and providing a high voltage alarm when detection of a high voltage condition occurs at the regulated voltage output of the internal voltage regulator. According to a further embodiment, a keeper cell controls operation of the at least one output driver, wherein when the over-voltage detection circuit detects a high voltage at the regulated voltage output of the internal voltage regulator, the at least one output driver logic state is maintained at a last logic state thereof by the keeper cell.

According to a further embodiment, a power disconnect switch is coupled between the regulated voltage output of the internal voltage regulator and the core logic circuits, wherein the core logic circuits are disconnected from the regulated voltage output of the internal voltage regulator when the high voltage at the regulated voltage output of the internal voltage regulator is detected. According to a further embodiment, the power disconnect switch is a power field effect transistor.

According to a further embodiment, the core logic circuits comprise a digital processor and a memory. According to a further embodiment, the digital processor is a microcontroller. According to a further embodiment, the digital processor is selected from the group consisting of a microprocessor, a digital signal processor (DSP), a programmable logic array (PLA) and an application specific integrated circuit (ASIC).

According to a further embodiment, a brown-out reset circuit is coupled to the regulated voltage output of the internal voltage regulator, wherein when a voltage therefrom is less than a certain minimum operating voltage then the core logic circuits and the at least one output driver are put into the safe operating mode.

According to a further embodiment, the over-voltage detection circuit comprises: a voltage comparator; a voltage reference coupled to a negative input of the voltage comparator; and a voltage divider coupled between the regulated voltage output of the internal voltage regulator and a positive input of the voltage comparator, wherein when the regulated voltage output of the internal voltage regulator is greater than a voltage of the voltage reference an output of the voltage comparator is at a first logic level, otherwise the output of the voltage comparator is at a second logic level.

According to a further embodiment, the voltage reference is a bandgap voltage reference. According to a further embodiment, the first logic level is a logic high and the second logic level is a logic low. According to a further embodiment, the first logic level is a logic low and the second logic level is a logic high.

According to a further embodiment, an external power supply provides the supply voltage to the internal voltage regulator; and an external system supervisor coupled to an inhibit input of the power supply and having an input monitoring the high voltage alarm; wherein if the high voltage alarm indicates that the high voltage condition exists at the regulated voltage output of the internal voltage regulator then the system supervisor causes the power supply to reduce the supply voltage to the internal voltage regulator. According to a further embodiment, the supply voltage is reduced to substantially zero volts. According to a further embodiment, a disconnect power switch is coupled between the power supply and the internal voltage regulator, wherein if the high voltage alarm indicates that the high voltage condition exists at the regulated voltage output of the internal voltage regulator then the system supervisor causes the disconnect power switch to open, thereby disconnecting the supply voltage from the internal voltage regulator.

According to another embodiment, a method for detecting an internal voltage regulator over-voltage condition in an integrated circuit device may comprise the steps of: measuring a voltage at an external connection of an integrated circuit device coupled to an internal voltage regulator; determining whether the measured voltage at the external connection is greater than a reference voltage; and placing core logic and at least one output driver of the integrated circuit device into a safe mode when the measured voltage at the external connection is greater than the reference voltage.

According to a further embodiment of the method, when activating a respective keeper cell the at least one output driver is kept at a most recent logic level when in the safe mode. According to a further embodiment of the method, the step of generating a high voltage alarm occurs when there is a high voltage condition because the external connection is coupled to the internal voltage regulator. According to a further embodiment of the method, the step of disconnecting core logic of the integrated circuit device from an output voltage of the internal voltage regulator occurs when in the safe mode.

According to a further embodiment of the method, a supply voltage to the internal voltage regulator is providing from a power supply; the high voltage alarm is monitored with a system supervisor; and the supply voltage from the power supply to the internal voltage regulator is inhibited when the high voltage alarm indicates an occurrence of the high voltage condition. According to a further embodiment of the method, the supply voltage is inhibited to substantially zero volts. According to a further embodiment of the method, the supply voltage is disconnected from the internal voltage regulator when the high voltage alarm indicates an occurrence of the high voltage condition.

BRIEF DESCRIPTION OF THE DRAWINGS

A more complete understanding of the present disclosure may be acquired by referring to the following description taken in conjunction with the accompanying drawings wherein.

Figure 1:
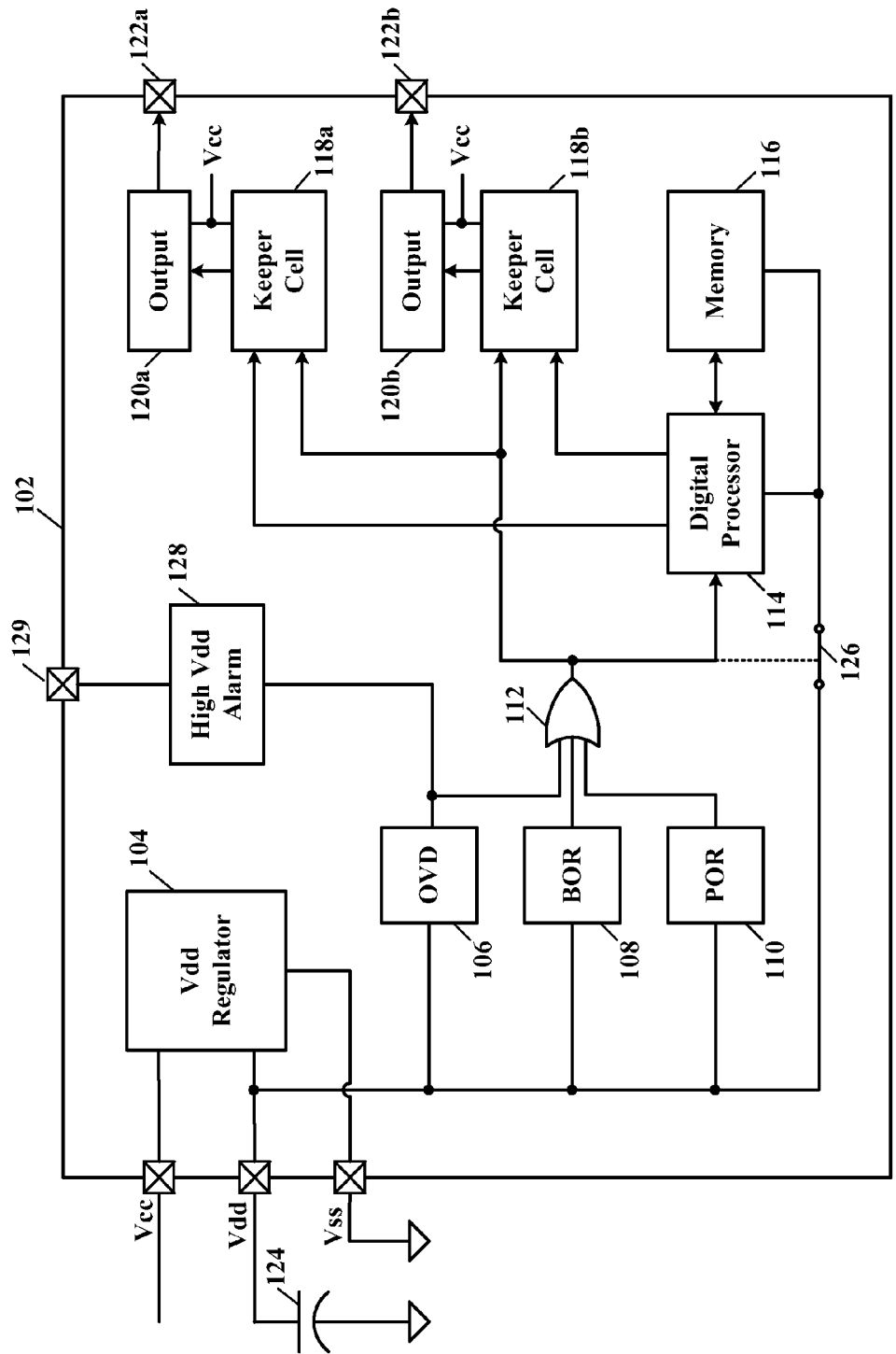
FIG. 1 illustrates a schematic block diagram of an integrated circuit device having voltage regulator over-voltage detection and protection, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of an integrated circuit device having voltage regulator over-voltage detection and protection, according to a specific example embodiment of this disclosure. An integrated circuit device 102 may comprise an internal voltage regulator 104, an over-voltage detection (OVD) circuit 106, a brownout-on reset (BOR) circuit 108, a power-on reset (BOR) circuit 110, an OR gate 112, a digital processor 114, a memory 116, keeper cells 118 and output drivers 120. External connections for the integrated circuit device 102 are provided for the driver outputs at connections 122, and connections for Vcc (voltage from power source, e.g., battery), Vdd (regulated lower voltage than Vcc to core logic circuits, e.g., digital processor 114 and memory 116) and Vss (power source and core logic ground). Other connections, such as inputs, may be provided but are not shown. The digital processor 114 may be, for example but is not limited to, a microcontroller, a microprocessor, a digital signal processor (DSP), a programmable logic array (PLA) or an application specific integrated circuit (ASIC).

The Vcc, Vdd and Vss connections may be adjacent to each other as shown, wherein the Vdd connection may inadvertently become shorted to either the Vss or the Vcc connection, thereby causing a malfunction and/or failure of the integrated circuit device 102. If the Vdd and Vss connections short together then either or both of the BOR and/or POR circuits 108 and 110, respectively, will cause the output of the OR gate 112 to go to a logic high ("1") and cause the integrated circuit device 102 to go into a standby "safe mode" condition wherein the output drivers 120 are held in the most recent logic level by the respective keeper cells 118, the digital processor 114 and memory 116 are put into a standby, no operation mode, and, optionally, the Vdd regulator output 104 is disconnected from the core logic circuits (e.g., digital processor 114 and memory 116) by opening a switch 126, e.g., solid state field effect transistor switch.

If the Vdd and Vcc connections short together then the OVD circuit 106 will cause the output of the OR gate 112 to go to a logic high ("1") and cause the integrated circuit device 102 to go into the standby "safe mode" condition as described hereinabove. A high Vdd alarm circuit 128 may indicate the high Vdd condition on a high Vdd alarm output connection 129 so that a system lock-out, shutdown or recover action can be taken. The integrated circuit device 102 may be, for example but is not limited to, a microcontroller, a microprocessor, a digital signal processor (DSP), a programmable logic array (PLA), an application specific integrated circuit (ASIC), etc.

Figure 2:
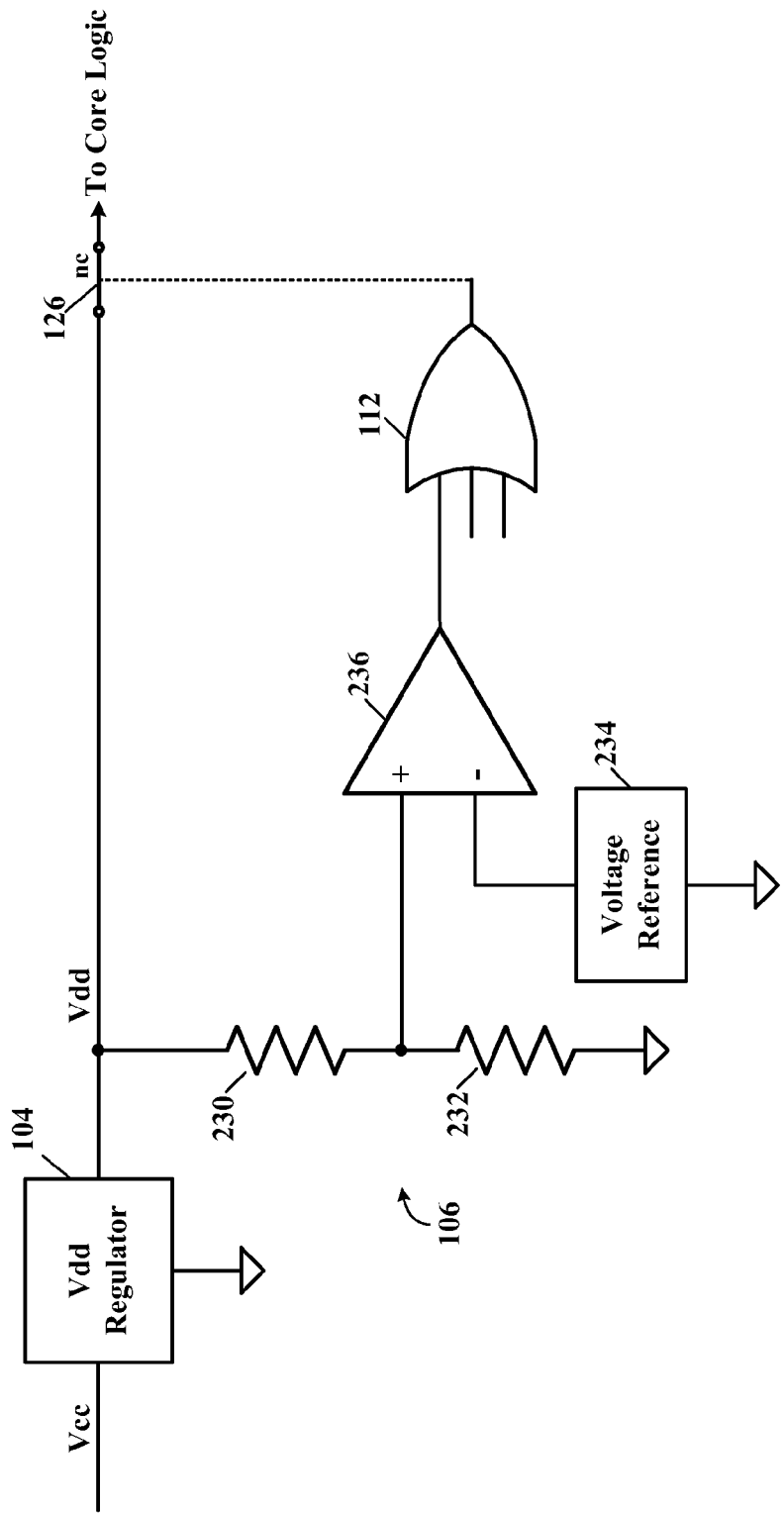
FIG. 2 illustrates a schematic diagram of a more detailed embodiment of the over-voltage detection circuit shown in FIG. 1.

Referring to FIG. 2, depicted is a schematic diagram of a more detailed embodiment of the over-voltage detection circuit shown in FIG. 1. The OVD circuit 106 may comprise a voltage comparator 236, a voltage divider network comprising resistors 230 and 232, and a voltage reference 234. The junction between the resistors 230 and 232 is connected to the positive (+) input of the voltage comparator 236, and the voltage reference 234 is connected to the negative (−) input of the voltage comparator 236. When the voltage at the junction between the resistors 230 and 232 is less than or equal to the voltage from the voltage reference 234, the output of the voltage comparator 236 is at a logic low ("0") and the OR gate 112 output is also at a logic low (if there is no logic high signal from either of the BOR and POR circuits 108 and 110). If the voltage at the junction between the resistors 230 and 232 is greater than the voltage from the voltage reference 234, then the output of the voltage comparator 236 goes to a logic high ("1") and the OR gate 112 output also will be at a logic high ("1"). The voltage reference 234 may be a bandgap voltage reference, etc.

Figure 3:
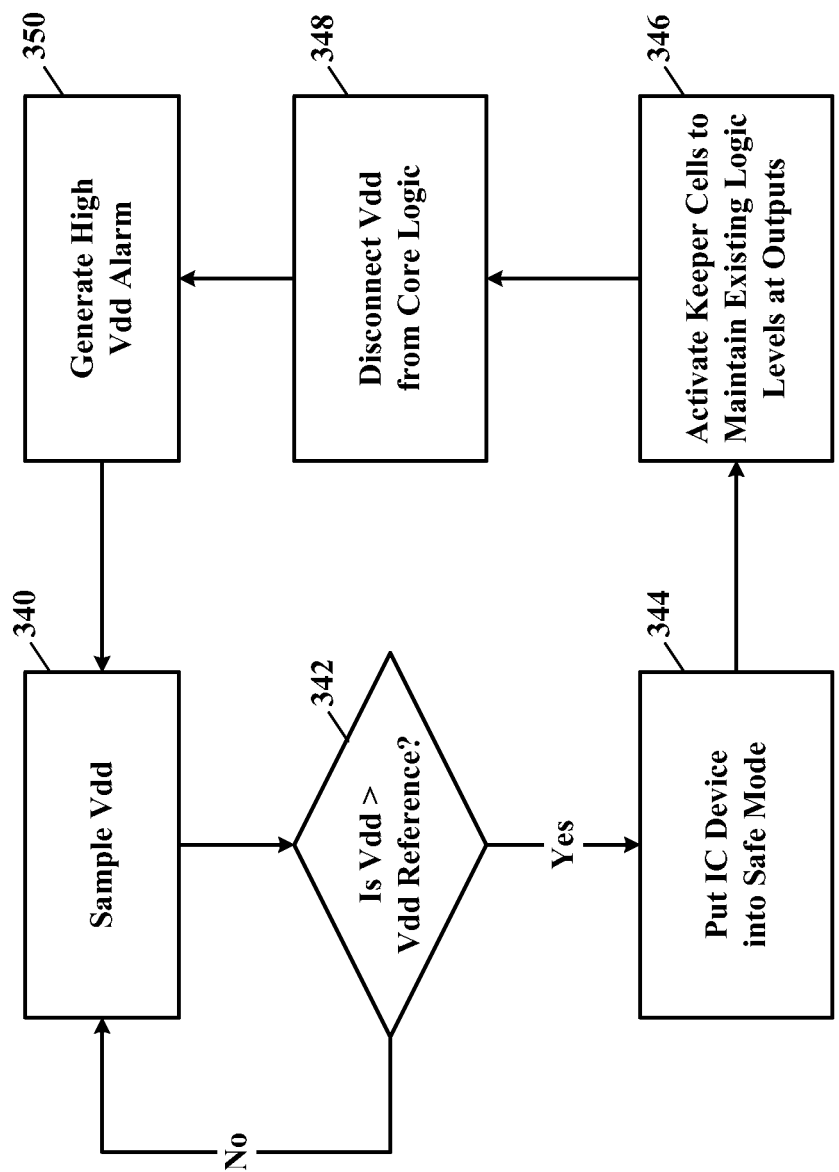
FIG. 3 illustrates a schematic flow diagram of the operation of the over-voltage detection and protection for the integrated circuit device shown in FIG. 1, according to the teachings of this disclosure.

Referring to FIG. 3, depicted is a schematic flow diagram of the operation of the over-voltage detection and protection for the integrated circuit device shown in FIG. 1, according to the teachings of this disclosure. Vdd is sampled or measured in step 340. In step 342 the sampled or measured Vdd is compared to a reference voltage and if the sampled or measured Vdd is greater than the reference voltage then in step 344 the integrated circuit device 102 is put into a safe mode, e.g., shutdown and/or disconnected from Vdd. In step 346 keeper cells 118 may be activated to maintain existing logic levels at the output drivers 120 to maintain system integrity during the high Vdd voltage event. In step 348, the core logic, e.g., digital processor 114 and memory 116, that is powered from Vdd may be disconnected from its over voltage power source. In step 350 a high Vdd alarm may be generated so as to alert the system that a high Vdd voltage fault has occurred.

Figure 4:
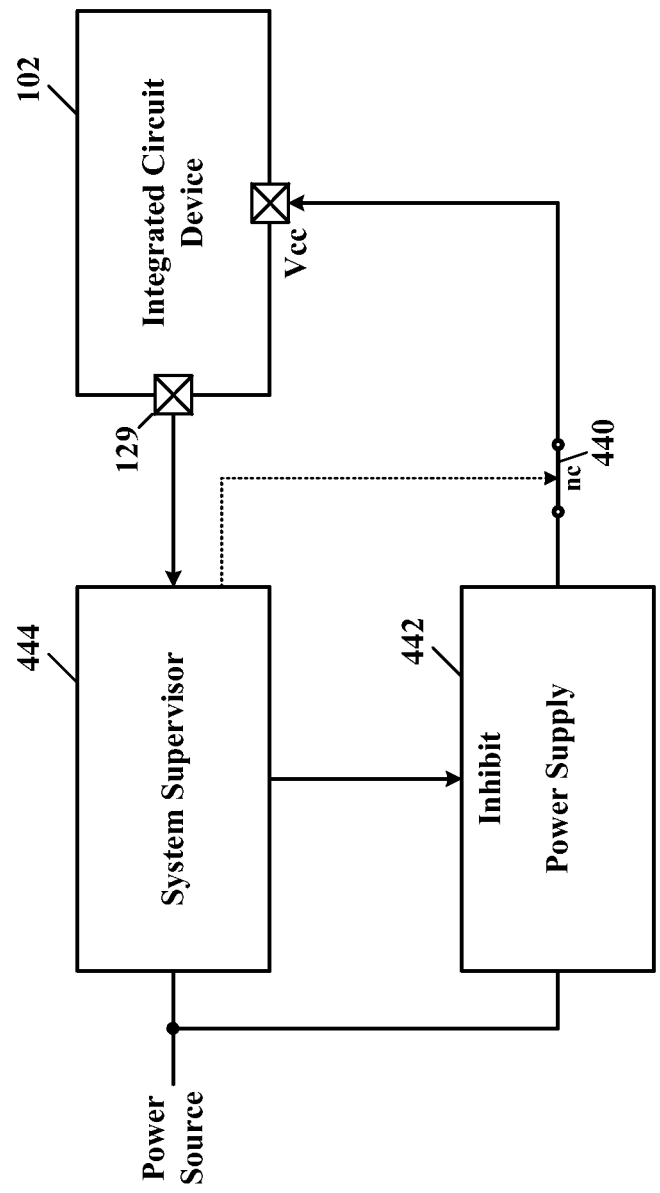
FIG. 4 illustrates a schematic block diagram of the integrated circuit device shown in FIG. 1, a system supervisor and a power supply are coupled to the integrated circuit device of FIG. 1, according to another specific example embodiment of this disclosure.

Referring to FIG. 4, depicted is a schematic block diagram of the integrated circuit device shown in FIG. 1, a system supervisor and a power supply are coupled to the integrated circuit device of FIG. 1, according to another specific example embodiment of this disclosure. A power supply, e.g., Vcc regulator, 442 and a system supervisor 444 are connected to a power source. The system supervisor 444 receives status signals, e.g., high Vdd alarm 128, from the integrated circuit device 102. The power supply 442 supplies Vcc voltage to the integrated circuit device 102. A power switch 440, e.g., power transistor, may be adapted to disconnect the Vcc voltage from the integrated circuit device 102. The system supervisor 444 may receive a high Vdd alarm signal from node 129 of the integrated circuit device 102, and may then either cause the power switch 440 to open, or shutdown (or reduce to a safe voltage level) the power supply 442 through an inhibit control input thereof.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An integrated circuit device having an internal voltage regulator over-voltage detection circuit, said integrated circuit device comprising: an internal voltage regulator coupled to external connections for a filter capacitor and a supply voltage;
   an over-voltage detection circuit having an input coupled to a regulated voltage output of the internal voltage regulator;
   core logic circuits receiving operating voltage from the regulated voltage output of the internal voltage regulator; and
   at least one output driver having a failsafe circuit for maintaining the at least one output driver in a safe operating condition;
   wherein when the over-voltage detection circuit detects a high voltage at the regulated voltage output of the internal voltage regulator, the core logic circuits and the at least one output driver are put into a safe operating mode, and
   a keeper cell controlling operation of the at least one output driver, wherein when the over-voltage detection circuit detects a high voltage at the regulated voltage output of the internal voltage regulator, the at least one output driver logic state is maintained at a last logic state thereof by the keeper cell.

2. The integrated circuit device according to claim 1, further comprising an over-voltage alarm coupled to the over-voltage detection circuit and providing a high voltage alarm when detection of a high voltage condition occurs at the regulated voltage output of the internal voltage regulator.

3. The integrated circuit device according to claim 1, further comprising a power disconnect switch coupled between the regulated voltage output of the internal voltage regulator and the core logic circuits, wherein the core logic circuits are disconnected from the regulated voltage output of the internal voltage regulator when the high voltage at the regulated voltage output of the internal voltage regulator is detected.

4. The integrated circuit device according to claim 3, wherein the power disconnect switch is a power field effect transistor.

5. The integrated circuit device according to claim 1, wherein the core logic circuits comprise a digital processor and a memory.

6. The integrated circuit device according to claim 5, wherein the digital processor is a microcontroller.

7. The integrated circuit device according to claim 5, wherein the digital processor is selected from the group consisting of a microprocessor, a digital signal processor (DSP), a programmable logic array (PLA) and an application specific integrated circuit (ASIC).

8. An integrated circuit device having an internal voltage regulator over-voltage detection circuit, said integrated circuit device comprising: an internal voltage regulator coupled to external connections for a filter capacitor and a supply voltage:
   an over-voltage detection circuit having an input coupled to a regulated voltage output of the internal voltage regulator;
   core logic circuits receiving operating voltage from the regulated voltage output of the internal voltage regulator;
   at least one output driver having a failsafe circuit for maintaining the at least one output driver in a safe operating condition; and
   a brown-out reset circuit coupled to the regulated voltage output of the internal voltage regulator, wherein when a voltage therefrom is less than a certain minimum operating voltage then the core logic circuits and the at least one output driver are put into the safe operating mode,
   wherein when the over-voltage detection circuit detects a high voltage at the regulated voltage output of the internal voltage regulator, the core logic circuits and the at least one output driver are put into a safe operating mode, wherein the at least one output driver is held in the most recent logic level.

9. The integrated circuit device according to claim 1, wherein the over-voltage detection circuit comprises:
- a voltage comparator;
- a voltage reference coupled to a negative input of the voltage comparator; and
- a voltage divider coupled between the regulated voltage output of the internal voltage regulator and a positive input of the voltage comparator, wherein when the regulated voltage output of the internal voltage regulator is greater than a voltage of the voltage reference an output of the voltage comparator is at a first logic level, otherwise the output of the voltage comparator is at a second logic level.

10. The integrated circuit device according to claim 9, wherein the voltage reference is a bandgap voltage reference.

11. The integrated circuit device according to claim 9, wherein the first logic level is a logic high and the second logic level is a logic low.

12. The integrated circuit device according to claim 9, wherein the first logic level is a logic low and the second logic level is a logic high.

13. A system comprising:
- an integrated circuit device having an internal voltage regulator over-voltage detection circuit, said integrated circuit device comprising:
  - an internal voltage regulator coupled to external connections for a filter capacitor and a supply voltage;
  - an over-voltage detection circuit having an input coupled to a regulated voltage output of the internal voltage regulator;
  - core logic circuits receiving operating voltage from the regulated voltage output of the internal voltage regulator;
  - at least one output driver having a failsafe circuit for maintaining the at least one output driver in a safe operating condition;
  - wherein when the over-voltage detection circuit detects a high voltage at the regulated voltage output of the internal voltage regulator, the core logic circuits and the at least one output driver are put into a safe operating mode, wherein the at least one output driver is held in the most recent logic level;
  - an over-voltage alarm coupled to the over-voltage detection circuit and providing a high voltage alarm when detection of a high voltage condition occurs at the regulated voltage output of the internal voltage regulator;
- an external power supply for providing the supply voltage to the internal voltage regulator; and
- an external system supervisor coupled to an inhibit input of the power supply and having an input monitoring the high voltage alarm;
- wherein if the high voltage alarm indicates that the high voltage condition exists at the regulated voltage output of the internal voltage regulator then the system supervisor causes the power supply to reduce the supply voltage to the internal voltage regulator.

14. The integrated circuit device according to claim 13, wherein supply voltage is reduced to substantially zero volts.

15. The integrated circuit device according to claim 13, further comprising a disconnect power switch between the power supply and the internal voltage regulator, wherein if the high voltage alarm indicates that the high voltage condition exists at the regulated voltage output of the internal voltage regulator then the system supervisor causes the disconnect power switch to open, thereby disconnecting the supply voltage from the internal voltage regulator.

16. A method for detecting an internal voltage regulator over-voltage condition in an integrated circuit device, said method comprising the steps of:
- measuring a voltage at an external connection of an integrated circuit device coupled to an internal voltage regulator;
- determining whether the measured voltage at the external connection is greater than a reference voltage; and
- placing core logic and at least one output driver of the integrated circuit device into a safe mode when the measured voltage at the external connection is greater than the reference voltage and activating a respective keeper cell to keep the at least one output driver at a most recent logic level when in the safe mode.

17. The method according to claim 16, wherein the core logic circuits comprise a digital processor and a memory.

18. The method according to claim 16, further comprising the step of generating a high voltage alarm when a high voltage condition occurs at the external connection coupled to the internal voltage regulator.

19. The method according to claim 16, further comprising the step of disconnecting core logic of the integrated circuit device from an output voltage of the internal voltage regulator when in the safe mode.

20. A method for detecting an internal voltage regulator over-voltage condition in an integrated circuit device comprising an internal voltage regulator, said method comprising the steps of:
- providing a supply voltage to the internal voltage regulator from a power supply;
- measuring a voltage at an external connection of the integrated circuit device coupled to the internal voltage regulator;
- determining whether the measured voltage at the external connection is greater than a reference voltage; and
- placing core logic and at least one output driver of the integrated circuit device into a safe mode when the measured voltage at the external connection is greater than the reference voltage;
- generating a high voltage alarm when a high voltage condition occurs at the external connection coupled to the internal voltage regulator
- disconnecting core logic of the integrated circuit device horn an output voltage of the internal voltage regulator when in the safe mode;
- monitoring the high voltage alarm with a system supervisor; and
- inhibiting the supply voltage from the power supply to the internal voltage regulator when the high voltage alarm indicates an occurrence of the high voltage condition.

21. The method according to claim 20, wherein the supply voltage is inhibited to substantially zero volts.

22. The method according to claim 20, further comprising the step of disconnecting the supply voltage from the internal voltage regulator when the high voltage alarm indicates an occurrence of the high voltage condition.

23. The system according to claim 13, wherein the core logic circuits comprise a digital processor and a memory.

* * * * *